United States Patent
Teng et al.

(10) Patent No.: US 10,608,881 B2
(45) Date of Patent: Mar. 31, 2020

(54) APPLICATION-BASED NETWORK SEGMENTATION IN A VIRTUALIZED COMPUTING ENVIRONMENT

(71) Applicant: Nicira, Inc., Palo Alto, CA (US)

(72) Inventors: Shengbo Teng, Beijing (CN); Nan Wang, Beijing (CN); Yisan Zhao, Beijing (CN); Jingtao Zhang, Beijing (CN)

(73) Assignee: NICIRA, INC., Palo Alto, CA (US)

( * ) Notice: Subject to any disclaimer, the term of this patent is extended or adjusted under 35 U.S.C. 154(b) by 86 days.

(21) Appl. No.: 15/272,440

(22) Filed: Sep. 22, 2016

(65) Prior Publication Data
US 2018/0083837 A1    Mar. 22, 2018

(51) Int. Cl.
| | |
|---|---|
| *G06F 15/173* | (2006.01) |
| *H04L 12/24* | (2006.01) |
| *H04L 12/46* | (2006.01) |
| *H04L 29/06* | (2006.01) |
| *H04L 12/26* | (2006.01) |

(52) U.S. Cl.
CPC ...... *H04L 41/0893* (2013.01); *H04L 12/4641* (2013.01); *H04L 41/046* (2013.01); *H04L 43/14* (2013.01); *H04L 63/0236* (2013.01)

(58) Field of Classification Search
CPC . H04L 41/0893; H04L 12/4641; H04L 69/22; H04L 12/24; H04L 29/06; H04L 12/46
See application file for complete search history.

(56) References Cited

U.S. PATENT DOCUMENTS

| | | | | |
|---|---|---|---|---|
| 7,966,654 | B2* | 6/2011 | Crawford | H04L 63/0236 726/11 |
| 8,873,556 | B1* | 10/2014 | Zuk | H04L 45/306 370/392 |
| 2006/0075478 | A1 | 4/2006 | Hyndman et al. | |
| 2009/0265755 | A1* | 10/2009 | Hamilton, II | H04L 63/0227 726/1 |
| 2010/0290475 | A1* | 11/2010 | Belanger | H04L 49/355 370/401 |
| 2011/0067107 | A1* | 3/2011 | Weeks | G06F 21/55 726/23 |
| 2012/0170477 | A1* | 7/2012 | Hieda | H04L 45/586 370/252 |
| 2013/0019277 | A1* | 1/2013 | Chang | H04L 63/0218 726/1 |

(Continued)

*Primary Examiner* — Cheikh T Ndiaye
(74) *Attorney, Agent, or Firm* — Su IP Consulting

(57) ABSTRACT

Example methods are provided for host to implement application-based network segmentation in a virtualized computing environment. The method may comprise detecting an egress packet from a virtualized computing instance supported by the host for transmission to a destination and identifying a source application associated with the egress packet. The source application may be one of multiple applications supported by the virtualized computing instance, the multiple applications being associated with respective target networks. The method may further comprise, based on a network policy configured for the source application, determining a particular target network associated with the source application; and sending, to the destination, the egress packet via a physical network interface controller (NIC) associated with the particular target network.

18 Claims, 6 Drawing Sheets

(56) References Cited

U.S. PATENT DOCUMENTS

| | | | |
|---|---|---|---|
| 2014/0115578 A1* | 4/2014 | Cooper | G06F 21/606 718/1 |
| 2015/0082417 A1* | 3/2015 | Bhagwat | H04L 63/0263 726/13 |
| 2016/0134531 A1* | 5/2016 | Assarpour | H04L 45/74 370/392 |

* cited by examiner

Application-based Network Policies 152

| Application Name 401 | Application Version 402 | Port Number 403 | Action 404 | Target Network 405 | PNIC 406 | |
|---|---|---|---|---|---|---|
| APP1 (web browser) | * | 80, 443 | Allow | Internet | PNIC1 | ~ 410 |
| APP2 (ERP) | * | 3456 | Allow | LAN | PNIC2 | ~ 420 |
| APP2 (ERP) | * | 31443 | Reject | - | - | ~ 430 |
| APP3 (email) | 2016 | * | Allow | LAN | PNIC2 | ~ 440 |
| APP3 (email) | 2013, 2010 | * | Block | - | - | ~ 450 |

Fig. 4

APPLICATION-BASED NETWORK SEGMENTATION IN A VIRTUALIZED COMPUTING ENVIRONMENT

BACKGROUND

Unless otherwise indicated herein, the approaches described in this section are not admitted to be prior art by inclusion in this section.

Virtualization allows the abstraction and pooling of hardware resources to support virtual machines in a virtualized computing environment, such as a Software-Defined Datacenter (SDDC). For example, through server virtualization, virtual machines running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc. In practice, virtual machines supported by the same host and applications running on each virtual machine may have different network security requirements, which can be challenging for the host to satisfy.

BRIEF DESCRIPTION OF DRAWINGS

FIG. 4 is a schematic diagram illustrating example application-based network policies;

DETAILED DESCRIPTION

Figure 1:
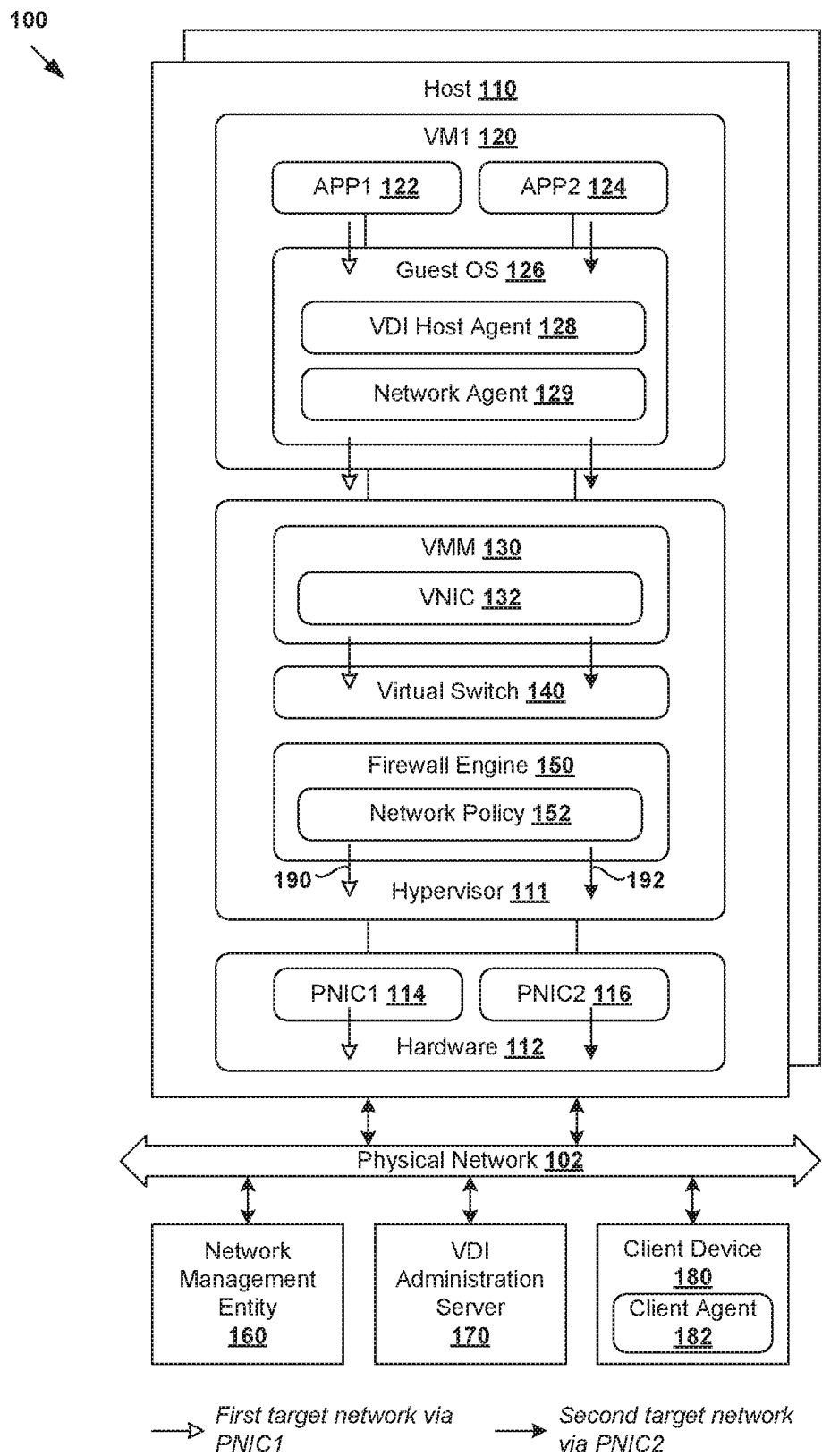
FIG. 1 is a schematic diagram illustrating a first example virtualized computing environment in which application-based network segmentation may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to network security will now be explained in more detail using FIG. 1, which is a schematic diagram illustrating first example virtualized computing environment 100 in which application-based network segmentation may be implemented. It should be understood that, depending on the desired implementation, virtualized computing environment 100 may include additional and/or alternative components than that shown in FIG. 1.

In the example in FIG. 1, virtualized computing environment 100 includes multiple hosts 110 (one shown in detail for simplicity) that are connected via physical network 102. Each host 110 includes suitable virtualization software such as hypervisor 111, and hardware 112 to support virtual machines, such as "VM1" 120. Although one virtual machine is shown in FIG. 1 for simplicity, host 110 (also known as "host computer", "host device", "physical server", "computer system", etc.) may be supporting tens or hundreds of virtual machines.

"VM1" 120 represents a software implementation of a physical machine. Although examples of the present disclosure refer to "virtual machines," it should be understood that a "virtual machine" running within a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system such as Docker, etc.; or implemented as an operating system level virtualization), virtual private servers, client computers, etc. The virtual machines may also be complete computation environments, containing virtual equivalents of the hardware and software components of a physical computing system.

Hypervisor 111 maintains a mapping between underlying hardware 112 of host 110 and virtual resources allocated to "VM1" 120. Hardware 112 includes various physical components (not all shown for simplicity), such as Central Processing Unit (CPU), memory (e.g., random access memory), storage disk (e.g., solid state drive, hard disk drive), and physical network interface controllers (NICs) labelled "PNIC1" 114 and "PNIC2" 116. Virtual resources are allocated to "VM1" 120 to support applications, such as "APP1" 122 and "APP2" 124, running on top of guest operating system (OS) 126. For example, corresponding to hardware 112, the virtual resources may include virtual CPU, virtual memory, virtual disk, virtual network interface controller (vNIC), etc.

Virtual machine monitor (VMM) 130 is implemented by hypervisor 111 to emulate hardware resources. For example, VMM 130 is to emulate vNIC 132 to provide network access for "VM1" 120. In practice, VMM 130 may be considered as components that are part of "VM1" 120, or alternatively, separated from "VM1" 120. In both cases, VMM 130 maintains the state of vNIC 132, and data relating to the state is migrated with "VM1" 120. When interacting with another node (e.g., endpoint, virtual machine, host, etc.), "VM1" 120 may send egress (i.e., outgoing) packets and receive ingress packets (i.e., incoming) via vNIC 132. Virtual switch 140 handles packet forwarding to and from "VM1" 120.

To protect host 110 against security threats caused by unwanted packets, hypervisor 111 implements firewall engine 150 to filter packets to and from "VM1" 120. In one example, a distributed firewall is implemented in virtualized computing environment 100 using multiple local firewall engines that are distributed over different hosts. In this case, firewall engine 150 on host 110 represents one of the local firewall engines. Security policies (e.g., firewall rules) for packet filtering are configurable through network management entity 160, which may be any suitable management component. For example, network management entity 160 may be a network virtualization manager, sometimes referred to as a software defined network (SDN) manager.

(An example of a network manager is the NSX manager component of VMware NSX™, available from VMware, Inc.) Network management entity 160 may be implemented by one or more physical and/or virtual entities.

Through network virtualization facilitated by network management entity 160, benefits similar to server virtualization may be derived for networking services in virtualized computing environment 100. For example, software-defined networks (SDNs) may be provisioned, changed, stored, deleted and restored programmatically via network management entity 160 without having to reconfigure the underlying physical hardware. Further, network segmentation may be implemented to segment a data center into distinct network segments using software, such as by deploying virtual network(s) on top of the physical network. This form of software-based network segmentation should be contrasted against traditional hardware-based physical segmentation that is enabled using physical devices, such as Top of Rack (ToR) switches, aggregate switches, core switches, routers, etc.

Conventionally, network segmentation may be implemented at a virtual machine level (also known as microsegmentation), which assumes that all applications running on a single virtual machine require access to the same network. However, in practice, this assumption may not be true in various practical scenarios. An example is shown in FIG. 1, in which Virtual Desktop Infrastructure (VDI) is implemented to allow remote users (i.e., from the perspective of host 110) to access virtual desktops and applications running on host 110. A virtual desktop is a virtual machine configured for use as a workstation by remote users who can access and use the virtual machine as though it were a traditional desktop or laptop computer system.

Using VDI, a user's desktop computing environment may be hosted on "VM1" 120 at host 110, rather than on client device 180 operated by the user. For example, VDI client agent 182 on client device 180 is configured to capture and send the user's inputs (e.g., mouse click, keyboard input, etc.) to VDI host agent 128 (e.g., VMware's Horizon View Agent, a trademark of VMware, Inc.). Based on the inputs, VDI host agent 128 then captures the graphical user interface (GUI) showing the virtual desktop or application display output, and delivers the GUI to client device 180. VDI administration server 170 allows administrators to deploy and manage desktops and applications, control user authentication, etc. Any suitable protocol may be used, such as Personal Computer over Internet Protocol (PCoIP), Remote Desktop Protocol (RDP), etc. In an alternate implementation, the display outputs are captured and user inputs are injected into a virtual machine at the virtual device level, i.e., using the hypervisor, without any agents running in the virtual machine for that purpose.

Through a guest operating system, such as Microsoft Windows (a trademark of Microsoft Corporation), running on "VM1" 120, the user may launch applications, interact with the applications, and manage settings and data, etc. For example in FIG. 1, the user may launch "APP1" 122, which represents an Internet-facing application such as a web browser that requires access to the Internet. The user may further launch "APP2" 124, which represents an enterprise resource planning (ERP) application that requires access to the enterprise's internal network. However, the enterprise may be strict security policies that forbid "APP1" 122 to connect to the internal network, and "APP2" 124 to connect to the Internet in order to protect sensitive information on the internal network.

Conventionally, in the above example, it will be necessary to deliver two virtual desktops to the remote user, each virtual desktop being implemented by a virtual machine. For example, a first virtual machine (e.g., "VM1" 120) will be used to run "APP1" 122 that requires access to the Internet. A second virtual machine (e.g., "VM2," not shown for simplicity) on host 110 will be used to run "APP2" 124 that requires access to the internal network. Although the enterprise's security policies are satisfied in this case, the solution is inefficient because deploying additional virtual machines consumes more software and hardware resources of host 110. This problem is exacerbated when there are many users (e.g., hundreds) that connect to host 110 to access desktops and applications. Further, conventionally, a user may be allowed to access a particular network. However, this cannot satisfy the requirement to allow the user to access different networks with different applications.

Application-Based Network Segmentation

According to examples of the present disclosure, network segmentation may be performed at an application level. In particular, different target networks may be defined for different applications that are supported by the same virtual machine. In the example in FIG. 1, application-based network segmentation may be implemented to allow "APP1" 122 to access a first target network (e.g., Internet) via "PNIC1" 114, and "APP2" 124 to access a second target network (e.g., internal network) via "PNIC2" 116. The target networks may be physically isolated from each other, i.e., by using separate routers and switches, etc., or they may be logically isolated, e.g., by using different virtual local area network (VLAN) identifiers. Using examples of the present disclosure, fine-grained network controls may be applied at the application level to improve network security within virtualized computing environment 100.

Figure 2:
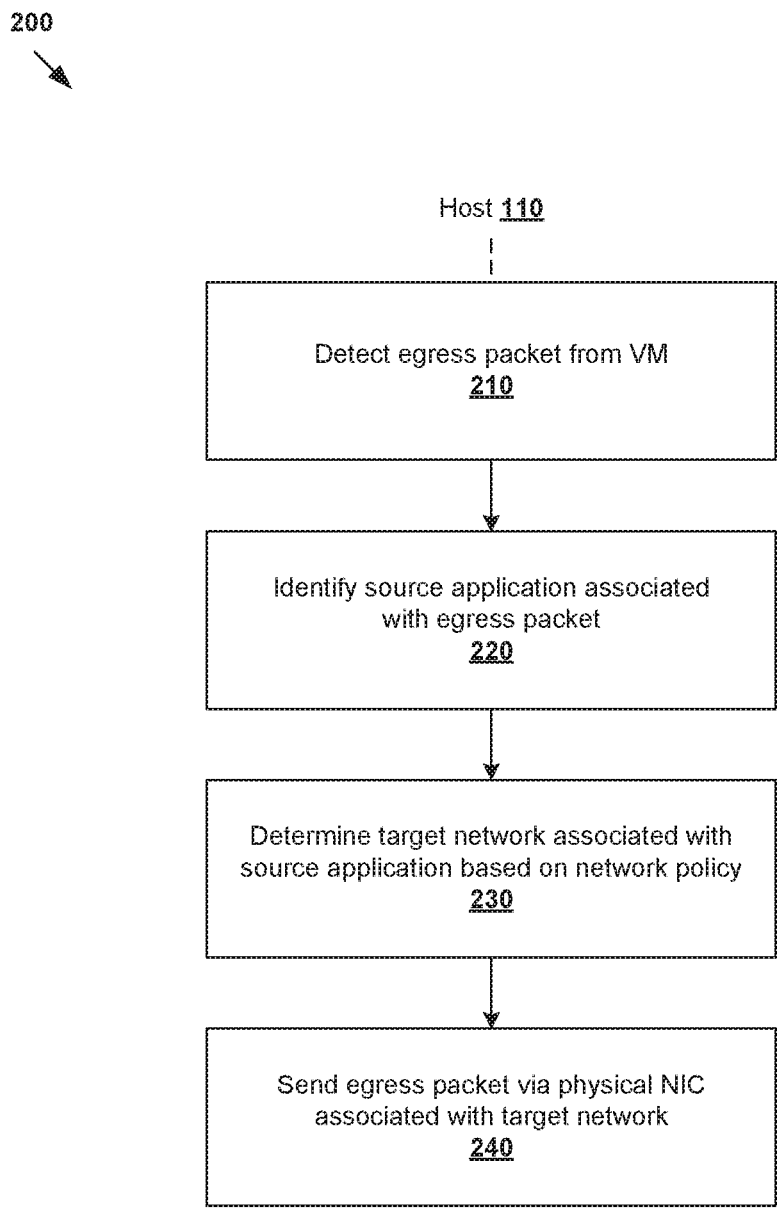
FIG. 2 is a flowchart of an example process for a host to implement application-based network segmentation in a virtualized computing environment.

In more detail, FIG. 2 is a flowchart of example process 200 for host 110 to perform application-based network segmentation in virtualized computing environment 100. Example process 200 may include one or more operations, functions, or actions illustrated by one or more blocks, such as 210 to 240. The various blocks may be combined into fewer blocks, divided into additional blocks, and/or eliminated depending on the desired implementation. In the following, "VM1" 120 will be used as an example "virtualized computing instance" in virtualized computing environment 100. Example process 200 may be performed by host 110, such as using firewall engine 150, and VDI host agent 128 and/or network agent 129.

At 210 in FIG. 2, host 110 detects an egress packet from "VM1" 120 hosted by host 110 for delivery to a destination. As used herein, the term "packet" may refer generally to a group of bits that can be transported together from a source to a destination, and is also known as "segment," "frame," "message," "datagram," etc. The egress packet may be layer-2 or layer-3 traffic. In one example, the egress packet may be a synchronization (SYN) packet to establish a transport protocol connection (e.g., Transmission Control Protocol (TCP) connection) with the destination. In another example, the packet may be a User Datagram Protocol (UDP) packet for transmission to the destination in a connectionless manner. The destination may be an external host, a virtual machine on the external host, etc.

At 220 in FIG. 2, host 110 identifies a source application associated with the egress packet, the source application being one of multiple applications supported by "VM1" 120. As will be described further using FIG. 3 to FIG. 5, the source application may be identified based on information collected by "VM1" 120, such as using VDI host agent 128 or network agent 129 at guest OS 126 of "VM1" 120. For example, the information may be collected by "VM1" 120 may include a name of the source application, etc.

At 230 in FIG. 2, based on network policy 152 configured for the source application, host 110 determines a target network for the egress packet. For example in FIG. 1, a first network policy may be configured for "APP1" 122 to specify its target network as an external network (e.g., the Internet). A second network policy may be may be configured for "APP2" 124 to define its target network as an enterprise's internal network (e.g., LAN). Example network policies will be described further using FIG. 4.

In practice, network policy 152 may specify any suitable "target network," such as layer-2 network, layer-3 network, etc. Here, the term "layer-2" generally refers to a Media Access Control (MAC) layer and "layer-3" to a network layer in the Open System Interconnection (OSI) model, although the concepts described herein may be applicable to other networking models. For example, the target network may be a local area network (LAN), VLAN, wide area network (e.g., Internet), etc. The target network may be an extended layer-2 virtual network implemented using any suitable overlay-based virtual networking technology (e.g., Virtual eXtensible Local Area Network (VXLAN)), etc.

At 240 in FIG. 2, host 110 sends the egress packet to the destination via a physical NIC associated with the target network. For example in FIG. 1, this may involve selecting between "PNIC1" 114 associated with a first target network (e.g., Internet) and "PNIC2" 116 associated with a second target network (e.g., internal network). In response to identifying "APP1" 122 as the source application, the egress packet is sent via "PNIC1" 114 (see 190 in FIG. 1). In contrast, in response to identifying "APP2" 124 as the source application, the egress packet is sent via "PNIC2" 116 (see 192 in FIG. 1).

Using example process 200, network policies may be dynamically applied at an application level to allow different applications to access different target networks. In the VDI example in FIG. 1, although "APP1" 122 and "APP2" 124 require access to different target networks, they may be supported by the same "VM1" 120. Unlike conventional solutions, this does not necessitate the deployment of multiple virtual machines to deliver "APP1" 122 and "APP2" 124. As will be discussed further using FIG. 3 to FIG. 5, application-based network policies may be configured and implemented by firewall engine 150 to allow, block or reject packets. Such security protection at an application level to further secures communication within virtualized computing environment 100.

In the following, various examples will be explained using FIG. 3 to FIG. 6. In particular, example application-based network policy configuration will be explained using FIG. 3; example application-based network policies using FIG. 4; example application-based network policy implementation using FIG. 5; and another example virtualized computing environment using FIG. 6. Although explained using the VDI example in FIG. 1, it should be understood that examples of the present disclosure may be applied to other scenarios in which application-based network segmentation is beneficial.

Application-Based Network Policy Configuration

Figure 3:
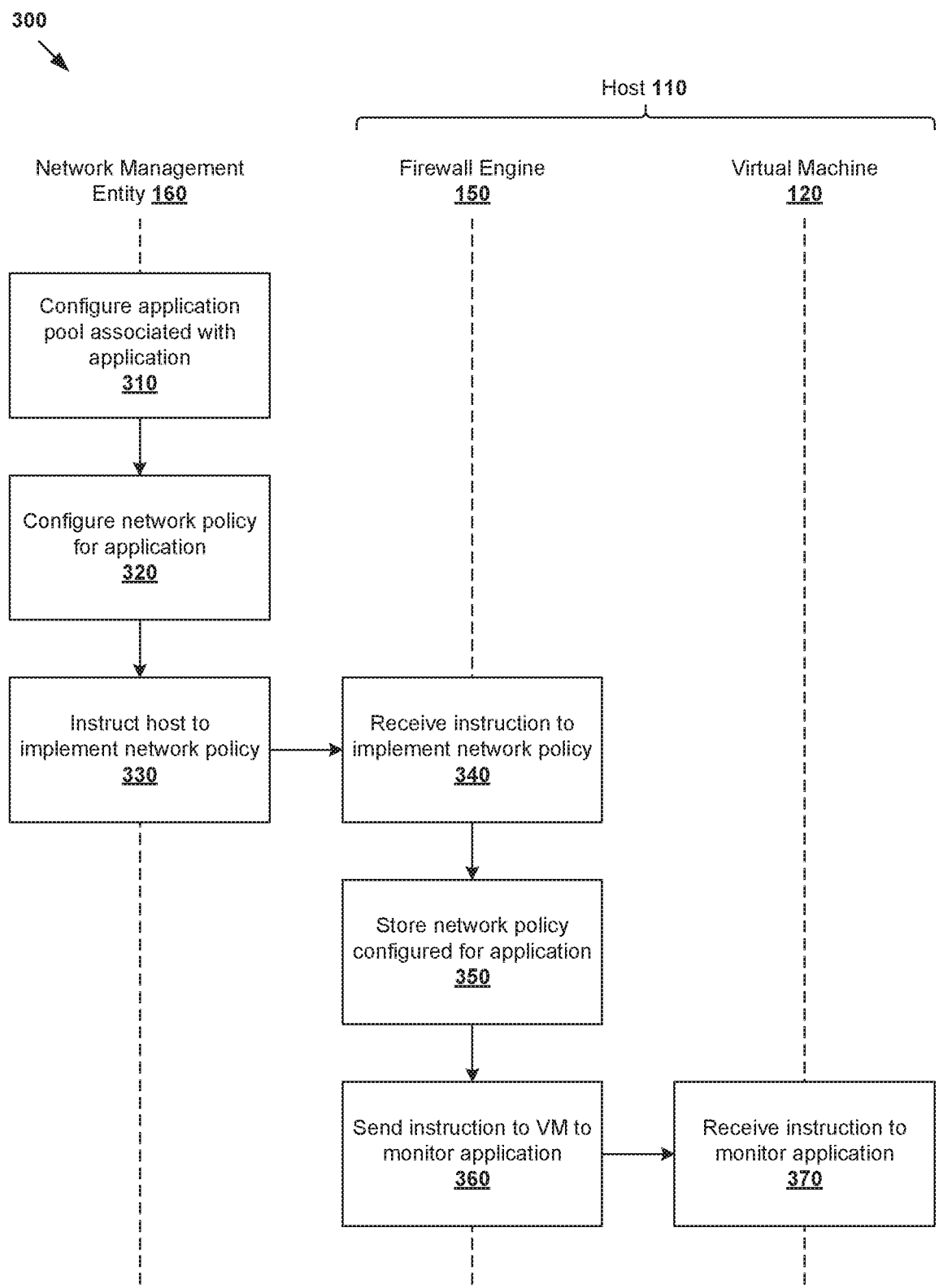
FIG. 3 is a flowchart of an example detailed process for configuring application-based network policies.

FIG. 3 is a flowchart of example detailed process 300 for configuring application-based network policies. Example process 300 may include one or more operations, functions, or actions illustrated by one or more blocks, such as 310 to 370. The various blocks may be combined into fewer blocks, divided into additional blocks, and/or eliminated depending on the desired implementation.

Blocks 310 and 320 in FIG. 3 relate to the configuration of application pools and network policies using network management entity 160. The configuration may be performed programmatically based on inputs received from a network administrator via any suitable interface, such as command line interface (CLI), a graphical user interface (GUI), etc. In one example, the configuration may be made through an interface provided by network management entity 160. Alternatively, in the VDI example in FIG. 1, the interface may be provided by VDI administration server 170, which sends the inputs to network management entity 160 to perform the configuration. Inputs may also be received via Application Programming Interface (API) calls supported by network management entity 160 and/or VDI administration server 170, etc.

Referring first to 310 in FIG. 3, an application pool is configured to provide access of an application to remote users via client devices 180. In the VDI example in FIG. 1, application pools may be configured to accelerate the deployment of applications on a farm of remote desktop services (RDS) hosts that includes host 110. In practice, a farm can have any suitable number of RDS hosts that provide a common set of applications to users. The creation of a farm also facilitates load balancing and fault tolerance among various RDS hosts.

Each application pool is associated with a single application and a single farm. For example in FIG. 1, a first application pool may be configured for "APP1" 122, a second application pool configured for "APP2" 124, etc. An application pool may be associated with any suitable property, such as application pool ID, display name, version information of the application, publisher of the application, full pathname of an executable file of the application, full pathname of a starting directory of the application, parameters to pass to the application when it starts, description, etc. The entitlement of a user, or a group of users, to access the application pool may also be configured.

At 320 in FIG. 3, a network policy is configured for each application to specify a target network. Several examples are provided in FIG. 4, which illustrates example application-based network policies 152. Using the example in FIG. 1, "APP1" 122 represents web browser (e.g., Internet Explorer version 10, a trademark of Microsoft Inc.) and "APP2" 124 represents an ERP application for business management activities. Additionally, "APP3" (not shown in FIG. 1 for simplicity) represents an email application (e.g., Microsoft Outlook, a trademark of Microsoft Inc.).

"APP1" 122 requires access to the Internet, while both "APP2" 124 and "APP3" require access to a LAN. Corresponding network policies 410-450 in FIG. 4 are configured to satisfy the network access requirements of "APP1" 122, "APP2" 124 and "APP3." Each network policy is associated with an application name (see 401), application version (see 402), source port number (see 403), action (see 404), target network (see 405) and associated physical NIC (see 406). Action 404 may also be configured to allow, block or reject packets.

Relating to "APP1" 122, first network policy 410 is configured to allow egress packets with source port number=80 or 443 from "APP1" 122 to access the Internet via "PNIC1" 114. Relating to "APP2" 124, second network policy 420 is configured to allow egress packets with source port number=3456 from "APP2" 124 to access the LAN via "PNIC2" 116. However, packets with source port number=31443 will be rejected according to third network policy 430. Relating to "APP3," fourth network policy 440 is configured to allow egress packets with any source port number from "APP3" with version=2016 to access the LAN via "PNIC2" 116. However, egress packets from other versions (e.g., 2013 and 2010) of the same application will be blocked by fifth network policy 450.

In practice, the "allow" action refers to permitting a packet to traverse firewall engine 150; while both "block" and "reject" refer to prohibiting the packet from traversing firewall engine 150. When blocked, a packet is generally dropped without sending a response. When rejected, a response is sent to the source to indicate that the packet is unacceptable. For example, the rejection response may be a TCP packet with a reset (RST) flag set, an Internet Control Message Protocol (ICMP) destination unreachable message, etc. If particular application version 402 is not specified (see asterisk "*"), action 404 will be applied on all versions. Similarly, if particular source port number 403 is not specified, action 404 will be applied on all port numbers.

Referring to FIG. 3 again, at 330, network management entity 160 sends a first instruction to host 110 to implement network policies 410-450. In practice, the first instruction may be sent via a message channel between network management entity 160 and firewall engine 150. In distributed firewall architecture, network management entity 160 may broadcast the instruction to multiple hosts that each support a local firewall engine.

At 340 and 350 in FIG. 3, in response to receiving the first instruction, firewall engine 160 of host 110 stores network policies 410-450 to monitor and filter packets from "APP1" 122, "APP2" 124 and "APP3." Network policies 410-450 will be applied by firewall engine 150 implemented by hypervisor 111, i.e., outside of "VM1" 120. This is to improve the security in virtualized computing environment 100 by protecting network policies 410-450 from being modified by an administrator or intruder who has access to guest OS 126.

At 360 in FIG. 3, firewall engine 160 sends a second instruction to VDI host agent 128 or network agent 129 to monitor the applications. For example, the second instruction may include a name of each application to be monitored. As will be described using FIG. 5, this may involve VDI host agent 128 or network agent 129 collecting information to facilitate implementation of network policies 410-450.

Application-Based Network Policy Implementation

Figure 5:
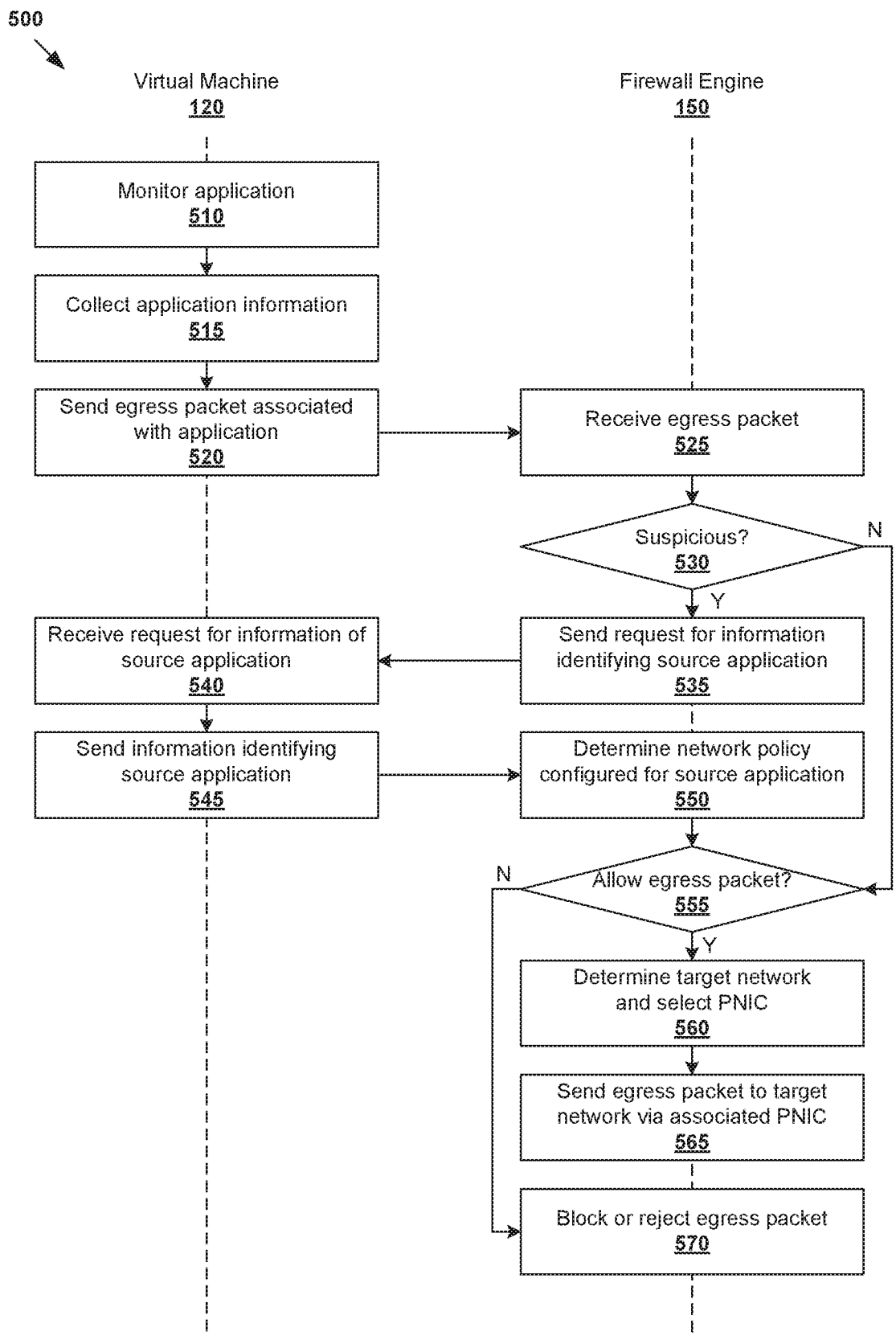
FIG. 5 is a flowchart of an example detailed process for implementing application-based network policies.

FIG. 5 is a flowchart of example detailed process 500 for implementing application-based network policies. Example process 500 may include one or more operations, functions, or actions illustrated by one or more blocks, such as 510 to 570. The various blocks may be combined into fewer blocks, divided into additional blocks, and/or eliminated depending on the desired implementation.

In the following example, "VM1" 120 may implement blocks 510, 515, 520, 540 and 545 using any suitable module, such as network agent 129. Blocks 525 to 535 and 550 to 570 may be implemented by host 110 using firewall engine 150 implemented by hypervisor 111. Although VDI host agent 128 and network agent 129 are illustrated as separate agents in FIG. 1, it should be understood that they may be combined in practice, such as by modifying VDI host agent 128 to include the functionality provided by network agent 129. In another example (e.g., non-VDI scenario that does not require VDI host agent 128), network agent 129 may be installed as part of a set of utilities (e.g., VMware Tools, a trademark of VMware) on guest OS 126.

At 510 and 515 in FIG. 5, network agent 129 monitors application 122/124 and collects information associated with application 122/124. For example, network agent 129 may monitor for socket operations initiated by application 122/124 at a socket layer implemented by guest OS 126. The socket layer is interposed between an application layer executing an application process and protocol-dependent layers, such as transport layer (e.g., TCP layer), network layer (e.g., IP layer), etc. In practice, a socket operation may be monitored using a hook or wrapper function, which generally alters the behavior of the socket operation by allowing additional or alternative processing to occur.

For example, in the case of Windows OS (trademark of Microsoft, Inc.), wrapper functions may be developed for Windows Dynamic Link Library (DLL), such as winsock.dll, wsock32.dll, etc. The wrapper functions are to hook respective socket operations, such as connect( ) bind( ) listen( ) close( ) etc. Based on the socket operation, network agent 129 may collect any suitable information, such as application name, source IP address, destination IP address, source port number, destination port number, protocol, any combination thereof, etc. Other information that may be collected include version information of the application, pathname to an executable file associated with the application, etc. For example, when bind( ) is called, its wrapper function will be called first to collect information such as the application name, binding IP address and port number from the parameters of bind( ).

At 520 in FIG. 5, "VM1" 120 generates and sends an egress packet associated with source application 122/124. In one example, in response to a socket operation (e.g., connect( )) to establish a Transmission Control Protocol (TCP) connection, a synchronization (SYN) packet to establish an outbound connection with a destination may be generated. In another example, in the case of User Datagram Protocol (UDP), the packet may be a first UDP packet from application 122/124 to the destination. The egress packet from "VM1" 120 is sent to firewall engine 150 via VNIC 132 and virtual switch 140.

At 525 and 530 in FIG. 5, in response to receiving the egress packet from "VM1" 120, firewall engine 150 performs packet inspection to determine whether each egress packet is suspicious. In one example, this may involve matching header information of the egress packet with an entry in a blacklist or whitelist maintained by firewall engine 150. If a match is found in the blacklist, the egress packet is blocked or rejected. If a match is found in the whitelist, the egress packet is allowed to traverse firewall engine 150. However, if no match is found, the egress packet is considered as suspicious.

The header information inspected by firewall engine 150 may include one or more of the following: source IP address, source port number, destination IP address, destination port number, protocol, etc. An entry in the blacklist represents network communication that is denied or forbidden by firewall engine 150, while one in the whitelist represents network communication allowed by firewall engine 150. For security reasons, each entry in the blacklist or whitelist is usually expired after a predetermined period of time.

At 535 and 540 in FIG. 5, in response to determination that the egress packet is suspicious, firewall engine 150 obtains information identifying a source application associated with the egress packet from network agent 129. In one example, this may involve sending a request to network agent 129 with the request specifying a source port number in the egress packet, etc. At 545 in FIG. 5, in response to the request from firewall engine 150, network agent 129 provides the information collected at 515 in FIG. 5 to firewall engine 150. The information may include a name of the source application. Where appropriate, network agent 129 may also provide version information of the source application (e.g., 2010 for "APP3" in FIG. 4), a pathname to an executable file associated with the source application, etc.

In practice, instead of firewall engine 150 sending a request for information identifying the source application at 535 in FIG. 5, any other suitable approach may be use to allow firewall engine 150 to access the information. For example, network agent 129 may automatically send the information to firewall engine 150, or store the information in memory or storage for later access by firewall engine 150.

At 550 in FIG. 5, based on the information collected by network agent 129, firewall engine 150 determines a network policy associated with the source application. At 555 and 560 in FIG. 5, in response to determination that the egress packet is allowed, firewall engine 150 determines a target network and selects associated physical NIC to send the egress packet.

For example, first network policy 410 in FIG. 4 may be applied by firewall engine 150 to allow an egress packet associated with source application="APP1" 122 and source port number=80. In this case, since the target network=Internet for "APP1" 122, "PNIC1" 114 (see also 190 in FIG. 1) is selected to send the egress packet. In another example, second network policy 420 may be applied to allow an egress packet associated with source application="APP2" 124 and source port number=3456. In this case, since the target network=LAN for "APP2" 124, "PNIC2" 116 (see also 192 in FIG. 2) is selected to send the egress packet.

Otherwise, at 555 and 570 in FIG. 5, the egress packet is blocked or rejected according to the network policy. For example, third network policy 430 may be applied by firewall engine 150 to reject an egress packet associated with source application="APP2" 124 and source port number=31446. In another example, fifth network policy 450 may be applied by firewall engine 150 to reject an egress packet associated with source application="APP3" and application version=2013.

Firewall engine 150 may also add an entry to the whitelist following an action to allow the egress packet, or to the blacklist following an action to block or reject. This way, a subsequent egress packet from "VM1" 120 that has the same source port number is not considered as suspicious at 530 in FIG. 5. In this case, when header information of the subsequent egress packet matches with the entry on the whitelist, firewall engine 150 allows the egress packet to be sent to its target network. Otherwise, when matched the entry on the blacklist, firewall engine 150 blocks or rejects the egress packet accordingly.

Figure 6:
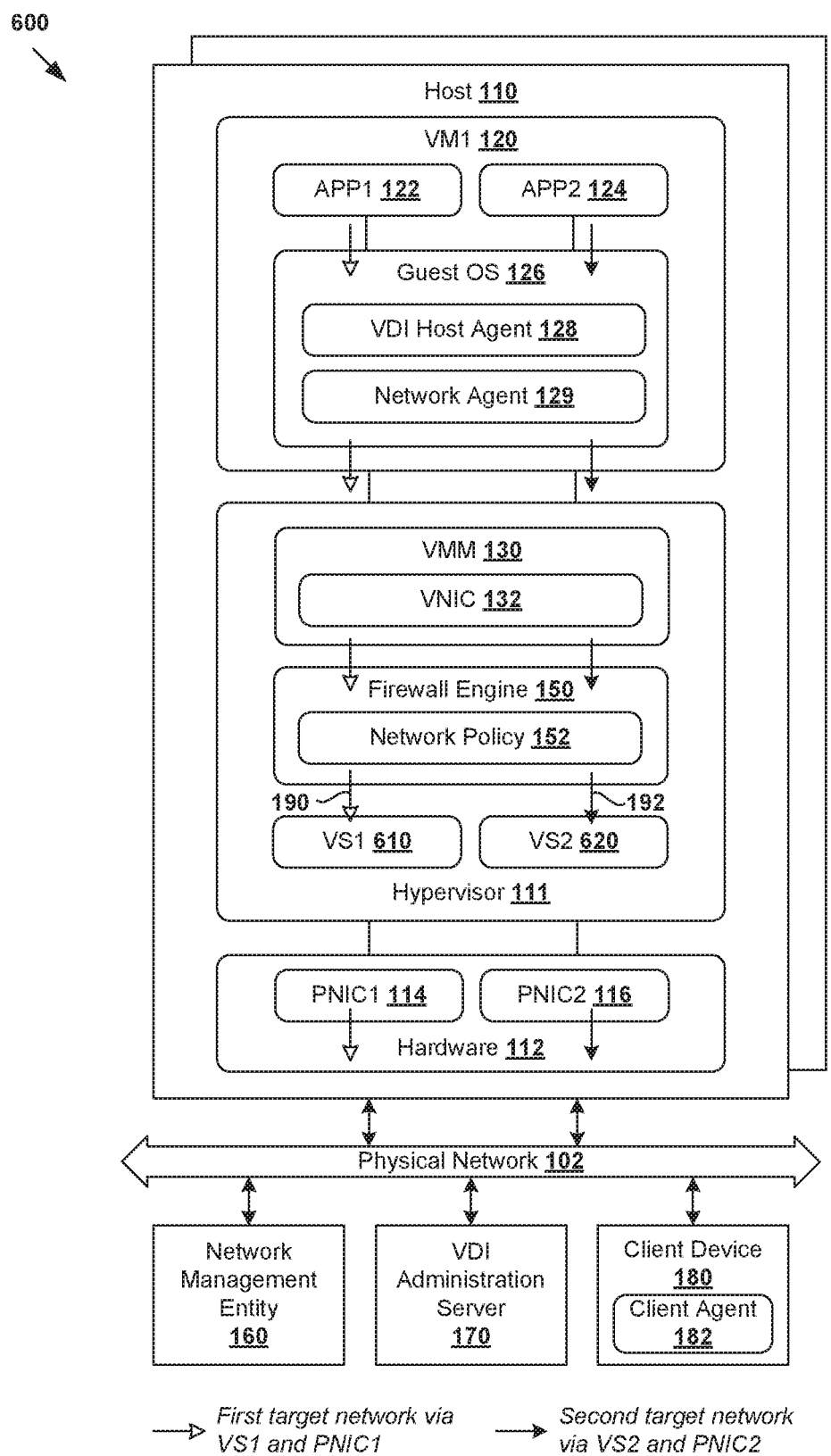
FIG. 6 is a schematic diagram illustrating a second example virtualized computing environment in which application-based network segmentation may be implemented.

In the above examples, firewall engine 150 selects between "PNIC1" 114 and "PNIC2" 116 to send the egress packet from "VM1" 120 based on network policies 410-450. In practice, the selection of a particular physical NIC (see 560 in FIG. 5) may involve firewall engine 150 selecting a virtual switch or vNIC associated with the physical NIC. An example is shown in FIG. 6, which is a schematic diagram illustrating second example virtualized computing environment 100 in which application-based network segmentation may be implemented. It should be understood that, depending on the desired implementation, virtualized computing environment 600 may include additional and/or alternative components than that shown in FIG. 6.

In the example in FIG. 6, there is a one-to-one mapping between a virtual switch and a physical NIC. First virtual switch labelled "VS1" 610 is associated with "PNIC1" 114, while second virtual switch labelled "VS2" 620 is associated with "PNIC2" 116. In this case, if the target network is accessible via "PNIC1" 114, firewall engine 150 selects "VS1" 610 to send the egress packet. Otherwise, if the target network is accessible via "PNIC2" 116, firewall engine 150 selects "VS2" 620 to send the egress packet.

Further, although one vNIC 132 is shown in FIG. 1 and FIG. 6, it should be understood that "VM1" 120 may be connected to multiple VNICs. For example, hypervisor 111 implements (i) a first vNIC that is mapped to "VS1" 610 and "PNIC1" 114, and (ii) a second vNIC mapped to "VS2" 620 and "PNIC2" 116. In this case, if the target network is accessible via "PNIC1" 114, firewall engine 150 selects the first vNIC to send the egress packet to the target network via the first vNIC, "VS1" 610 and "PNIC1" 114. Otherwise, if the target network is accessible via "PNIC2" 116, firewall engine 150 selects the second vNIC to send the egress packet to the target network via the second vNIC, "VS2" 620 and "PNIC2" 116.

In practice, "PNIC1" 114 and/or "PNIC2" 116 may belong to a "NIC team," which refer generally the grouping of multiple physical NICs into one logical NIC for fault tolerance and load balancing purposes. Depending on the desired implementation, NIC teaming is sometimes referred to as port trunking, link bundling, NIC bonding, link aggregation, etc. Any suitable technology or protocol may be used for NIC teaming, such as Link Aggregation Control Protocol (LACP), Ethernet Channel (EtherChannel), Port Aggregation Protocol (PAgP), etc. In this case, a particular physical NIC may be selected from a NIC team associated with the target network to send the egress packet at 560 in FIG. 5.

Further, application 122/124 in FIG. 1 may represent a containerized application. For example, using container technologies, containers "C1" and "C2" may be executed as isolated systems on guest OS 126 inside "VM1" 120. In this case, "C1" may be used to implement "APP1" 122, and "C2" to implement "APP2" 124. Any suitable container technology may be used, such as Linux container (LXC), Docker, etc. For example, LXC provides a lightweight virtualization mechanism to isolate processes and resources.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 6. For example, a computer system capable of acting as host 110 may be deployed in virtualized computing environment 100/600.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a host to implement application-based network segmentation in a virtualized computing environment, wherein the method comprises:
    detecting an egress packet from a virtualized computing instance supported by the host for transmission to a destination;
    identifying a source application associated with the egress packet, wherein the source application is one of multiple applications supported by the virtualized computing instance and the multiple applications are associated with respective target networks;
    based on a network policy configured for the source application, determining a particular target network associated with the source application;
    in response to determination that the egress packet is allowed based on the network policy, selecting, based on the particular target network, a physical network interface controller (NIC) associated with the particular target network, and sending, to the destination, the egress packet via the selected physical NIC;
    detecting a second egress packet from the virtualized computing instance supported by the host for transmission to a second destination;
    identifying a second source application associated with the second egress packet, wherein the second source application is one of the multiple applications supported by the virtualized computing instance;
    based on a second network policy configured for the second source application, determining a second particular target network associated with the second source application; and
    in response to determination that the second egress packet is allowed based on the second network policy, selecting, based on the second particular target network, a second physical network interface controller (NIC) associated with the second target network, and sending, to the second destination, the second egress packet via the second selected physical NIC, wherein the second particular target network differs from the particular target network, and the selected second physical NIC differs from the selected physical NIC.

2. The method of claim 1, wherein identifying the source application comprises:
    collecting, by an agent supported by the virtualized computing instance, information associated with the source application; and
    identifying, by a firewall engine supported by the host, the source application based on the information.

3. The method of claim 2, wherein the host implements Virtual Desktop Infrastructure (VDI) to allow a remote user to access the multiple applications, and prior to detecting the egress packet, the method further comprises:
    receiving, by the firewall engine, a first instruction from a network management entity to apply the network policy, wherein the network policy is configured for an application pool associated with the source application; and
    sending, by the firewall engine, a second instruction to the agent to monitor the source application.

4. The method of claim 2, wherein identifying the source application comprises:
    in response to determination that the egress packet is suspicious based on header information of the egress packet, obtaining the information associated with the source application from the virtualized computing instance.

5. The method of claim 2, wherein determining the particular target network comprises:
    based on the information that includes a name of the source application, determining the network policy configured for the source application, wherein the network policy specifies one or more of the following: the name, version information of the source application, a source port number and the target network.

6. The method of claim 1, wherein sending the egress packet via the selected physical NIC comprises one of the following:
    selecting, from multiple physical NICs of the host, the physical NIC to send the egress packet;
    selecting, from multiple virtual switches of the host, one of the multiple virtual switches that is associated with the physical NIC to send the egress packet; and
    selecting, from multiple virtual NICs of the host, one of the multiple virtual NICs associated with the physical NIC to send the egress packet.

7. A non-transitory computer-readable storage medium that includes a set of instructions which, in response to execution by a processor of a host, cause the processor to perform a method of application-based network segmentation in a virtualized computing environment, wherein the method comprises:

detecting an egress packet from a virtualized computing instance supported by the host for transmission to a destination;

identifying a source application associated with the egress packet, wherein the source application is one of multiple applications supported by the virtualized computing instance and the multiple applications are associated with respective target networks;

based on a network policy configured for the source application, determining a particular target network associated with the source application;

in response to determination that the egress packet is allowed based on the network policy, selecting, based on the particular target network, a physical network interface controller (NIC) associated with the particular target network, and sending, to the destination, the egress packet via the selected physical NIC;

detecting a second egress packet from the virtualized computing instance supported by the host for transmission to a second destination;

identifying a second source application associated with the second egress packet, wherein the second source application is one of the multiple applications supported by the virtualized computing instance;

based on a second network policy configured for the second source application, determining a second particular target network associated with the second source application; and in response to determination that the second egress packet is allowed based on the second network policy, selecting, based on the second particular target network, a second physical network interface controller (NIC) associated with the second target network, and sending, to the second destination, the second egress packet via the second selected physical NIC, wherein the second particular target network differs from the particular target network, and the selected second physical NIC differs from the selected physical NIC.

8. The non-transitory computer-readable storage medium of claim 7, wherein identifying the source application comprises:

collecting, by an agent supported by the virtualized computing instance, information associated with the source application; and identifying, by a firewall engine supported by the host, the source application based on the information.

9. The non-transitory computer-readable storage medium of claim 8, wherein identifying the source application comprises:

in response to determination that the egress packet is suspicious based on header information of the egress packet, obtaining the information associated with the source application from the virtualized computing instance.

10. The non-transitory computer-readable storage medium of claim 8, wherein determining the particular target network comprises:

based on the information that includes a name of the source application, determining the network policy configured for the source application, wherein the network policy specifies one or more of the following: the name, version information of the source application, a source port number and the target network.

11. The non-transitory computer-readable storage medium of claim 8, wherein the host implements Virtual Desktop Infrastructure (VDI) to allow a remote user to access the multiple applications, and prior to detecting the egress packet, the method further comprises:

receiving, by the firewall engine, a first instruction from a network management entity to apply the network policy, wherein the network policy is configured for an application pool associated with the source application; and sending, by the firewall engine, a second instruction to the agent to monitor the source application.

12. The non-transitory computer-readable storage medium of claim 7, wherein sending the egress packet via the physical NIC comprises one of the following:

selecting, from multiple physical NICs of the host, the physical NIC to send the egress packet;

selecting, from multiple virtual switches of the host, one of the multiple virtual switches that is associated with the physical NIC to send the egress packet; and selecting, from multiple virtual NICs of the host, one of the multiple virtual NICs associated with the physical NIC to send the egress packet.

13. A computer system configured to implement application-based network segmentation in a virtualized computing environment, the computer system comprising:

a processor;

multiple physical network interface controllers (NICs); and a non-transitory computer-readable medium having stored thereon instructions that, when executed by the processor, cause the processor to:

detect an egress packet from a virtualized computing instance supported by the computer system for transmission to a destination;

identify a source application associated with the egress packet, wherein the source application is one of multiple applications supported by the virtualized computing instance and the multiple applications are associated with respective target networks;

based on a network policy configured for the source application, determine a particular target network associated with the source application;

in response to determination that the egress packet is allowed based on the network policy, select, based on the particular target network, a physical NIC associated with the particular target network, and send, to the destination, the egress packet via the selected physical NIC;

detect a second egress packet from the virtualized computing instance supported by the computer system for transmission to a second destination;

identify a second source application associated with the second egress packet, wherein the second source application is one of the multiple applications supported by the virtualized computing instance;

based on a second network policy configured for the second source application, determine a second particular target network associated with the second source application; and in response to determination that the second egress packet is allowed based on the second network policy, select, based on the second particular target network, a second physical network interface controller (NIC) associated with the second target network, and send, to the second destination, the second egress packet via the second selected physical NIC, wherein the second particular target network differs from the particular target network, and the selected second physical NIC differs from the selected physical NIC.

14. The computer system of claim 13, wherein instructions for identifying the source application cause the processor to:
    collect, by an agent supported by the virtualized computing instance, information associated with the source application; and
    identify, by a firewall engine supported by the computer system, the source application based on the information.

15. The computer system of claim 14, wherein instructions for identifying the source application cause the processor to:
    in response to determination that the egress packet is suspicious based on header information of the egress packet, obtain the information associated with the source application from the virtualized computing instance.

16. The computer system of claim 14, wherein instructions for determining the particular target network cause the processor to:
    based on the information that includes a name of the source application, determine the network policy configured for the source application, wherein the network policy specifies one or more of the following: the name, version information of the source application, a source port number and the target network.

17. The computer system of claim 14, wherein the computer system implements Virtual Desktop Infrastructure (VDI) to allow a remote user to access the multiple applications, and prior to detecting the egress packet, the instructions further cause the processor to:
    receive, by the firewall engine, a first instruction from a network management entity to apply the network policy, wherein the network policy is configured for an application pool associated with the source application; and
    send, by the firewall engine, a second instruction to the agent to monitor the source application.

18. The computer system of claim 13, wherein instructions for sending the egress packet cause the processor to perform one of the following:
    select, from multiple physical NICs of the computer system, the one of the multiple physical NICs to send the egress packet;
    select, from multiple virtual switches of the computer system, one of the multiple virtual switches that is associated with the one of the multiple physical NICs to send the egress packet; and
    select, from multiple virtual NICs of the computer system, one of the multiple virtual NICs associated with the one of the multiple physical NICs to send the egress packet.

* * * * *